US007398544B2

(12) United States Patent
Candelore et al.

(10) Patent No.: US 7,398,544 B2
(45) Date of Patent: Jul. 8, 2008

(54) CONFIGURABLE CABLECARD (75) Inventors: Brant L. Candelore, Escondido, CA (US); Henry Derovanessian, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 462 days.

(21) Appl. No.: 10/815,484

(22) Filed: Mar. 31, 2004

(65) Prior Publication Data

US 2004/0228175 A1 Nov. 18, 2004

Related U.S. Application Data (60) Provisional application No. 60/469,768, filed on May 12, 2003.

(51) Int. Cl.
*H04L 9/32* (2006.01)
*H04K 1/00* (2006.01)
*H04N 7/16* (2006.01)
*G06F 1/00* (2006.01)

(52) U.S. Cl. .......................... 726/2; 713/182; 713/300; 725/25

(58) Field of Classification Search .................. 726/2, 726/20; 713/182, 300; 725/25
See application file for complete search history.

(56) References Cited

U.S. PATENT DOCUMENTS

| | | | | |
|---|---|---|---|---|
| 5,796,829 A * | 8/1998 | Newby et al. ................. 705/54 |
| 5,840,474 A * | 11/1998 | Andriessen et al. ......... 380/211 |
| 5,940,510 A * | 8/1999 | Curry et al. .................. 705/65 |
| 6,040,851 A * | 3/2000 | Cheng et al. ................ 725/132 |
| 6,091,818 A * | 7/2000 | Campinos et al. ........... 713/155 |
| 6,108,422 A * | 8/2000 | Newby et al. .................. 380/47 |
| 6,289,455 B1 * | 9/2001 | Kocher et al. ............... 713/194 |
| 6,457,126 B1 * | 9/2002 | Nakamura et al. .......... 713/166 |
| 6,628,891 B1 * | 9/2003 | Vantalon et al. .............. 386/94 |
| 6,637,027 B1 * | 10/2003 | Breslauer et al. ............. 725/25 |
| 6,898,285 B1 * | 5/2005 | Hutchings et al. ........... 380/200 |
| 7,024,683 B1 * | 4/2006 | Gee, Jr. ....................... 725/132 |
| 7,216,358 B1 * | 5/2007 | Vantalon et al. ............... 725/25 |
| 7,336,787 B2 * | 2/2008 | Unger et al. ................. 380/217 |
| 2002/0059642 A1 * | 5/2002 | Russ et al. ................... 725/135 |
| 2002/0146125 A1 * | 10/2002 | Eskicioglu et al. .......... 380/255 |
| 2002/0157115 A1 * | 10/2002 | Lu ............................. 725/131 |
| 2003/0026423 A1 * | 2/2003 | Unger et al. ................. 380/217 |
| 2003/0059047 A1 * | 3/2003 | Iwamura ..................... 380/201 |
| 2003/0172034 A1 * | 9/2003 | Schneck et al. ............... 705/54 |
| 2003/0196113 A1 * | 10/2003 | Brown et al. ................ 713/201 |
| 2003/0212895 A1 * | 11/2003 | Kisliakov .................... 713/185 |
| 2004/0019913 A1 * | 1/2004 | Wong et al. .................. 725/139 |
| 2004/0221302 A1 * | 11/2004 | Ansari et al. .................. 725/25 |

* cited by examiner

*Primary Examiner*—Emmanuel L Moise
*Assistant Examiner*—Techane J Gergiso
(74) *Attorney, Agent, or Firm*—Blakely, Sokoloff, Taylor & Zafman LLP (57) ABSTRACT According to one embodiment of the invention, a configurable CableCARD adaptable for use by multiple conditional access (CA) providers. CableCARD comprises core logic configured to descramble incoming scrambled content, a first CA logic block and a second CA logic block. Connected to the core logic, the first CA logic block uses a first CA function associated with a first CA provider. The second CA logic block is also connected to the core logic. The second CA logic block uses a second CA function associated with a second CA provider. Where the incoming content is scrambled according to the second CA function, the connection between the first CA logic block and the core logic is disabled.

20 Claims, 9 Drawing Sheets

CONFIGURABLE CABLECARD

CROSS-REFERENCE TO RELATED APPLICATIONS

This application is based on a U.S. Provisional Application No. 60/469,768 filed on May 12, 2003, incorporated herewith by reference.

BACKGROUND

1. Field

Embodiments of the invention relate to the field of communications. More specifically, one embodiment of the invention relates to a configurable module adapted to a digital device.

2. General Background

Analog communication systems are rapidly giving way to their digital counterparts. Digital television is currently scheduled to be available nationally. High-definition television (HDTV) broadcasts have already begun in most major cities on a limited basis. Similarly, the explosive growth of the Internet and the World Wide Web have resulted in a correlative growth in the increase of downloadable audio-visual files, including MP3-formatted audio files.

Simultaneously with, and in part due to this rapid move to digital communication systems, there have been significant advances in digital recording devices. Digital versatile disk (DVD) recorders, digital VHS video cassette recorders (D-VHS VCR), CD-ROM recorders (e.g., CD-R and CD-RW), MP3 recording devices, and hard-disk based recording units are merely representative of the digital recording devices that are capable of producing high quality recordings and copies thereof, without any increased degradation known in the analog counterparts. This poses a concern to content providers such as the motion picture and music industries, who are reluctant in providing downloadable digital content due to fears of unauthorized and uncontrolled copying such digital content.

In response, content and service providers have required consumer electronic manufacturers of retail navigation or host devices, such as set-top boxes or Digital TVs for example, to deploy them with conditional access (CA) slots. The service provider, e.g. cable operator, purchases modules for insertion into the CA slot from an incumbent CA provider for a particular cable system. These modules, hereinafter referred to as "CableCARDs," are PCMCIA form factor devices which plug into the CA slot on the host devices. The service provider provides these modules to better ensure that the owners of the host devices have paid for the services and programs being consumed.

The CableCARD will selectively descramble the content only if the customer is authorized. The CableCARDs are designed to descramble scrambled content into a clear format for viewing and/or listening, and may include constraints and conditions on the recording and playback when the content is copy-protected through re-scrambling as it flows back to the host device. This enables the content or service provider to scramble content before transmission to the targeted retail device(s).

The CableCARD is in communication with the host device and handles descrambling operations. Currently, each CableCARD is statically configured for a single CA provider in design, namely each CableCARD is exclusively configured by the respective CA manufacturer or provider to descramble content that was scrambled by that original CA provider in the headend, broadcast station, or uplink. The service provider, such as a cable operator for example, continuously purchases CableCARDs from the CA provider and keep a certain number on hand to meet the demand of customers wishing to use their own set-top box or DTV purchased at retail, but then cannot repurpose (i.e. alter) the CableCARD for a different CA provider that might be found in a different cable system owned by that service provider, or in case that the service provider might wish to use if it wanted to change the CA provider in a particular system. This lack of flexibility of the CableCARD has resulted in inflated costs for CableCARDs due to their non-configurable nature. The service provider is essentially stuck with the CA provider that manufactured the CableCARD. It would be nice if the service operator could purchase CableCARDs which could be repurposed when the CA provider for a particular system needs to be changed.

In addition, concerns with the CableCARD security continues to discourage further development. Thus, in order to ensure wide deployment of CableCARDs, additional security characteristics are needed as well. Likewise, it would be nice to have CableCARDs which could address the security concerns of multiple CA providers.

BRIEF DESCRIPTION OF THE DRAWINGS

Embodiments of the invention are illustrated by way of example and not by way of limitation in the accompanying drawings, in which like references indicate similar elements and in which.

DETAILED DESCRIPTION

Various embodiments of the invention relate to a configurable CableCARD for protecting the transfer of data. In one embodiment, such protection involves the descrambling and/or decrypting of digital content from a service provider internally within the CableCARD. Examples of a "service provider" include, but are not limited to a terrestrial broadcaster, cable operator, direct broadcast satellite (DBS) company, or a company providing content for download via the Internet.

In the United States cable industry, the detachable conditional access module is called a "CableCARD", however, in Europe, for the terrestrial and satellite industries, it is called "Common Interface Module". Both are PCMCIA type 2 form factor based, and the inventions described herein apply equally well to the Common Interface Module.

The CableCARD is a detachable security element, however, the inventions described herein apply equally well to embedded security modules. The embedded security modules may be separate integrated circuits (ICs) mounted in the set-top box, or they may be integrated in the same IC as the decoder IC.

In the following description, certain terminology is used to describe features of the invention. For instance, each term "component", "logic" or "block" is representative of hardware and/or software configured to perform one or more functions. Examples of "hardware" include, but are not limited or restricted to a field-programmable gate array (FPGA), a programmable logic device (PLD), or an integrated circuit (IC). The IC may include a processor such as a microprocessor, an application specific integrated circuit, a digital signal processor, a micro-controller, or the like.

Similarly, "software" includes a series of executable instructions in the form of an application, an applet, or even a routine. The software may be stored in any type of machine readable medium. The machine readable medium may be a programmable electronic circuit, a semiconductor memory device such as volatile memory (e.g., random access memory, etc.) and/or non-volatile memory (e.g., any type of read-only memory "ROM", flash memory), a floppy diskette, an optical disk (e.g., compact disk or digital video disc "DVD"), a hard drive disk, tape, or the like.

In addition, a "message" is a collection of bits forming a digital signal. An "interconnect" is a transmission medium that may include, but is not limited to one or more electrical wires, optical fibers, cables, wireless channels established by wireless signaling circuitry, or the like.

Figure 1:
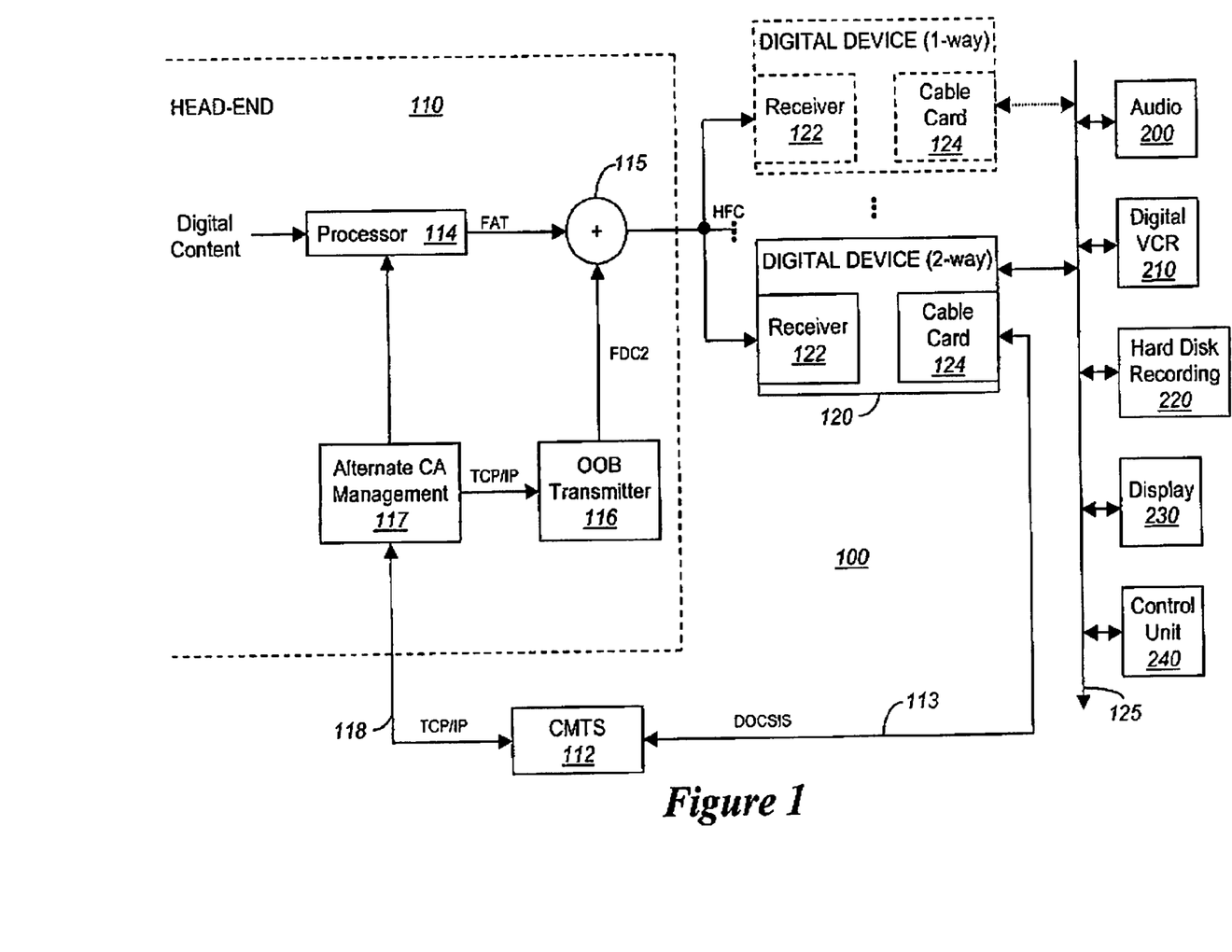
FIG. 1 is an exemplary embodiment of a secure content delivery system implemented with a digital device that comprises a receiver in communication with a configurable CableCARD.

Referring to FIG. 1, an exemplary embodiment of a secure content delivery system 100 is shown. The content delivery system 100 includes a headend 110 that transmits program data to one or more digital devices. This "program data" is a digital bit stream that comprises any one or more of the following: (1) program specific information such as system information, entitlement control message(s), or entitlement management message(s); or (2) digital content.

More specifically, "digital content" may include an image, audio, video or any combination thereof. The content may be in a scrambled or clear format. "System information" (SI) may include information on program names, time of broadcast, source, and method of retrieval and decoding, as well as copy management commands that provide a digital device 120, namely one of the digital devices, with information that will control how and when the digital content may be replayed, retransmitted and/or recorded. These copy management commands may also be transmitted along with an entitlement control message (ECM), which is generally used to regulate access to a particular channel or service. An "Entitlement Management Message" (EMM) may be used to deliver entitlements (sometimes referred to as "privileges") to the digital device 120. Examples of entitlements may include, but are not limited to access rights or descrambling keys. A descrambling key is generally a code that is required by logic to recover data in the clear from a scrambled format based on the entitlements granted.

Figure 4:
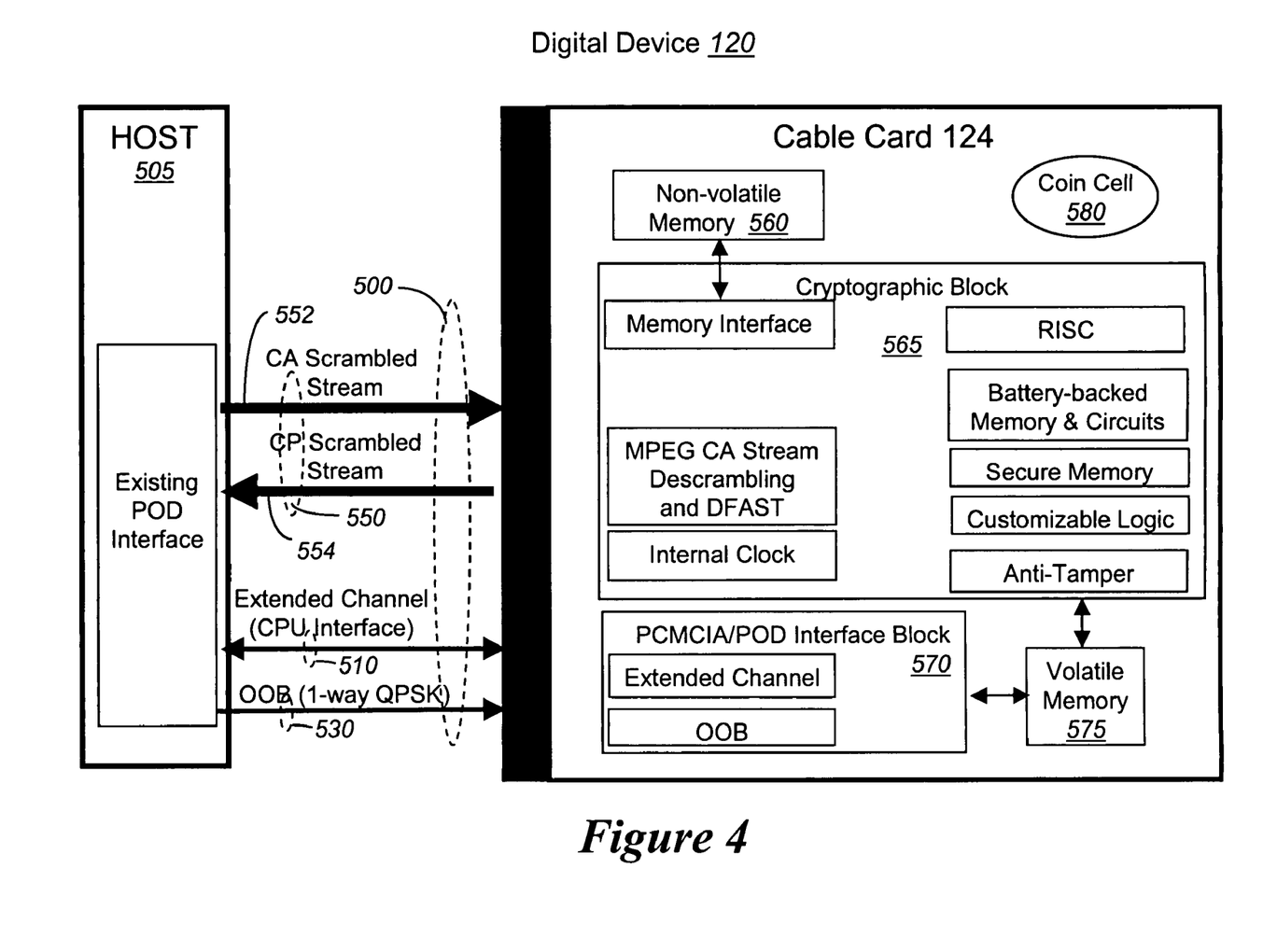
FIG. 4 is a detailed embodiment of the digital device implemented with a configurable CableCARD.

According to one embodiment of the invention, the Cable-CARD 124 may be implemented as a network card handling both entitlement management and descrambling operations based on messages received and/or sent over an Out-of-Band (OOB) interface described in FIG. 4. Of course, it is contemplated that security may be split so that the CableCARD 124 features descrambling operations, but is adapted to communicate with a smart card that handles entitlement management.

As shown for this embodiment of the invention, a processor 114 positioned at the headend 110 receives and combines the digital content with program specific information to produce program data. The program data (or a portion thereof) is processed by undergoing packet selection, encrypting and/or duplicating selected packets, modulating the program data (or portion thereof) or the like. The processed program data is transmitted from the headend 110.

For instance, when the targeted digital device 120 is a one-way set-top box, the processed program data is transmitted to a summing block 115. The summing block 115 may be adapted to combine information received from the processor 114 and an out-of-band (OOB) transmitter 116, normally at different frequencies. Certain OOB signaling, such as an EMM or Electronic Program Guide (EPG) data for example, are transmitted from the OOB transmitter 116 to the summing block 115. Thereafter, the summing block 115 can produce a message with different frequency components for transmission to a public network, such as a hybrid fiber coaxial (HFC) network, to which the digital device 120 is coupled.

When the targeted digital device 120 in a cable system is deployed as a two-way set-top box, the digital device 120 would be in bi-directional communications with a Cable Modem Termination System (CMTS) 112. Hence, it is contemplated that the summing block 115 and/or the OOB transmitter 116 may be removed. Instead, certain OOB signaling is transmitted between the headend 110 and the digital device 120 over bi-directional communications facilitated by the CMTS 112.

As shown, for this embodiment of the invention, a first interconnect 113 enables communications between the CMTS 112 and the digital device 120. Such communications may be in accordance with Data Over Cable Service Interface Specification (DOCSIS), for example. Also, the CMTS 112 is in communications with a second or an alternative conditional access (CA) management block 117 over a second interconnect 118. The second interconnect 118 supports a Transmission Control Protocol/Internet Protocol (TCP/IP) communications protocol.

Alternative CA management block 117 passes certain OOB signaling (e.g., EMM, EPG data, etc.) to the CMTS 112, which routes the OOB signaling to the CableCARD 124. Similarly, control information such as Impulse Pay-Per-View (IPPV) data or even video on demand (VOD) commands (e.g., fast-forward, rewind, stop, pause, play, etc.) may be returned to the alternative CA management block 117 from the digital device 120. This control information may be used to control the operations of the processor 114.

As further shown in FIG. 1, when implemented as a set-top box, the digital device 120 may be coupled to other components in content delivery system 100 via a third interconnect 125. The third interconnect 125 operates to transmit program data between digital device 120 and other components in content delivery system 100.

Depending on the type of product corresponding to the digital device 120, the content delivery system 100 may include an audio system 200 coupled to the interconnect 125. A digital VCR 210, such as a D-VHS VCR, may also be coupled to the digital device 120 and other components of the content delivery system 100 through the third interconnect 125.

A hard disk recording unit 220 may also be coupled to digital device 120 and other components via the third interconnect 125. Display 230 may include a high definition television display, a monitor, or another device capable of processing digital video signals. Finally, a control unit 240 may be coupled to the third interconnect 125. Control unit 240 may be used to coordinate and remotely control the operation of some or each of the components on the content delivery system 100.

The digital content of the program data may be transmitted in scrambled form. In one embodiment, as part of the program data, access requirements may be transmitted along with the scrambled content to digital device 120 (e.g., set-top box) and utilized by the CableCARD 124. An "access requirement" is a restrictive parameter used to determine if the digital device 120 implemented with conditional access functionality, and is authorized to descramble the scrambled content for viewing or listening purposes. For example, the access requirement may be a key needed to perceive (view and/or listen to) the content, a service tag associated with a given content provider, or even a particular descrambling software code.

When a scrambled program is received by the CableCARD 124, the access requirements for the program are compared to the entitlements associated with the digital device 120. The entitlements may state that the digital device 120 is entitled to view/playback content from a given content provider such as Home Box Office (HBO), for example. The entitlements may also include one or more keys needed to descramble the incoming digital content. The entitlements also may define the time periods for which CableCARD 124 may descramble the digital content.

Thus, in one embodiment, access requirements and entitlements form a part of the CableCARD 124 to determine whether the digital device 120 is authorized to view a particular program. The access requirements may be delivered to the CableCARD 124, coupled thereto over the interconnect 125, using packet identifiers (PIDs). Each PID may contain the access requirements associated with a given service. The content that is delivered to the conditional access unit may also include a large number of PIDs, thus enabling special revenue features, technical features, or other special features to be performed locally. The use of PIDs is fully described in a copending published U.S. patent application Ser. No. 10/037,499 filed Jan. 2, 2002.

Figure 2:
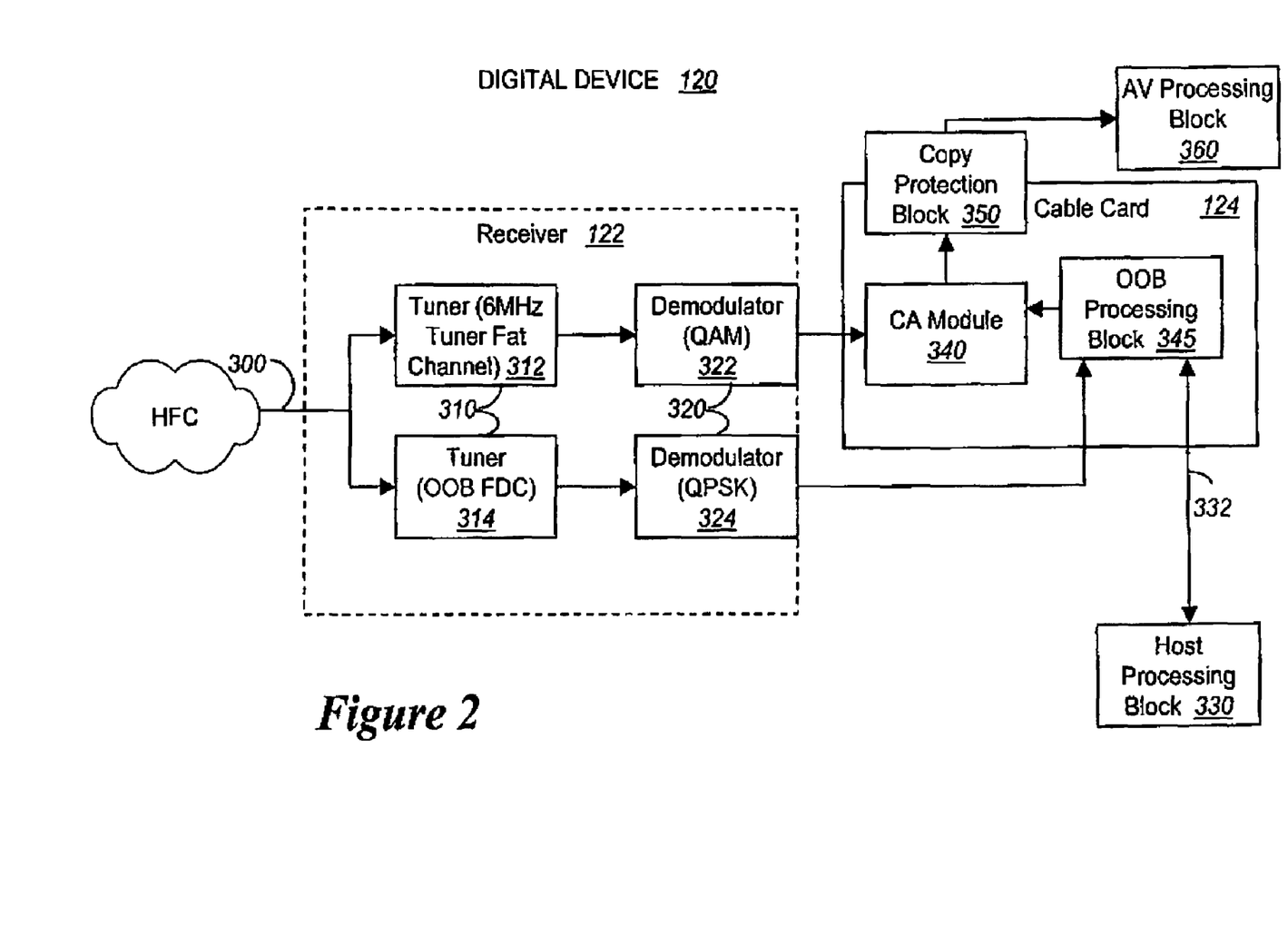
FIG. 2 is a first exemplary embodiment of the digital device of FIG. 1 featuring a configurable CableCARD.

Referring now to FIG. 2, a first exemplary embodiment of the digital device 120 is shown. Implemented as a one-way set-top box, the digital device 120 comprises the receiver 122 coupled to the CableCARD 124. The digital device 120 further comprises a host processing block 330 and an audio/visual (A/V) processing block 360.

Herein, for this embodiment, the receiver 122 comprises an interface 300, a plurality of tuners 310 and a plurality of demodulators 320, which are collectively coupled to the CableCARD 124. A host processing block 330 and A/V processing block 350 are in communications with the CableCARD 124.

A first tuner 312 is configured to tune to a first specified sub-frequency to recover the digital content. If the digital content is modulated, the recovered digital content is routed to a first demodulator 322. According to one embodiment of the invention, the first demodulator 322 performs quadrature amplitude demodulation (QAM) and routes the demodulated digital content to a conditional access (CA) module 340 deployed within the CableCARD 124.

A second tuner 314, however, is configured to tune to a second specified sub-frequency to recover certain OOB signaling. The first and second sub-frequencies may slightly different from each other, but are within a common frequency band. If the received OOB signaling is modulated, it is routed to a second demodulator 324 that demodulates the OOB signaling. According to one embodiment of the invention, the second demodulator 324 performs digital frequency quadrature phase shift keying (QPSK) to recover EMMs, SI, EPG data, tables, or other data for transmission to an OOB processing block 345 of the CableCARD 124. Of course, it is contemplated that one or more tuners 312 and 314 and one or more demodulators 322 and 324 may be deployed within the CableCARD 124.

The OOB processing block 345 filters incoming messages to recover program data, and in response, passes the recovered program data to the CA module 340. As an example, one or more recovered EMMs may be passed to the CA module 240 from OOB processing block 345. The control data associated with the EMMs may be used in processing the incoming digital content.

As further shown in FIG. 2, the OOB processing block 345 is in communications with the host processing block 330 over an extended channel 332. According to one embodiment, copy protection keys may be generated by the collective operations of the OOB processing block 345 and the host processing block 330 for use by copy protection block 350. Also, OOB processing block 345 routes EPG data to the host processing block 330, which routes the EPG data to a processor and/or graphics chip deployed within the digital device 120 in order to render the EPG data along with the digital content being displayed. For instance, the EPG data may be overlaid on the displayed video.

The A/V processing block 360 receives the digital content and processes the received digital content into a selected format. For instance, when the digital content is video, the A/V processing block 360 may receive a digital video stream for transformation into Motion Picture Experts Group (MPEG) packets. As another example, when the digital content is audio, the A/V processing block 360 may receive a digital audio stream for transformation into MP3 packets.

Figure 3:
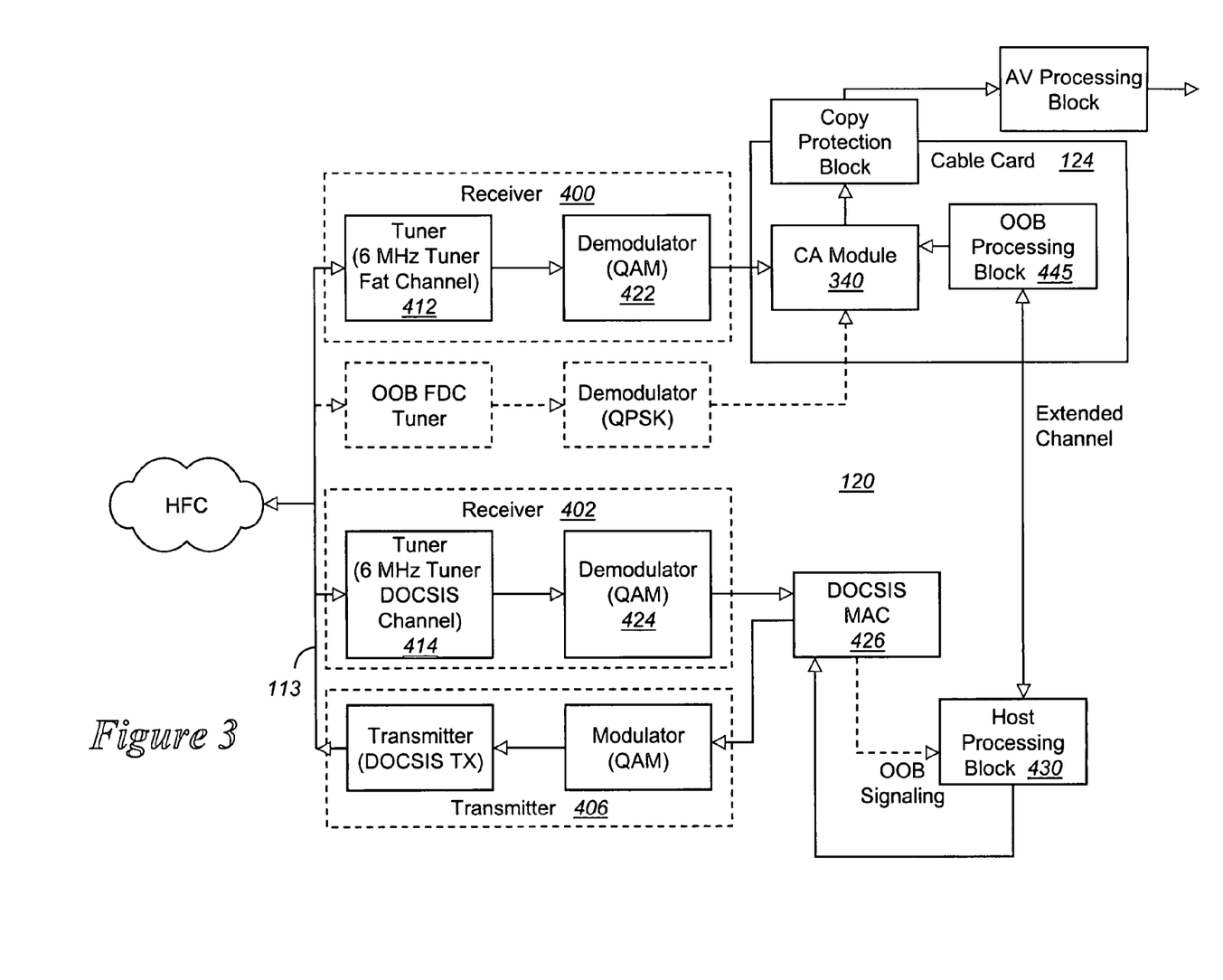
FIG. 3 is a second exemplary embodiment of the digital device of FIG. 1 featuring the CableCARD.

Referring now to FIG. 3, a second exemplary embodiment of the digital device 120 is shown. Implemented as a two-way set-top box, the digital device 120 comprises a first receiver 400 to receive digital content in-band and a second receiver 402 to receive OOB signaling. The second receiver 402 is configured to support the DOCSIS communication protocol. The digital device 120 further comprises a transmitter 406 that is configured to return information (e.g., cryptographic key, device serial number, DOCSIS Media Access Control "MAC" address, user profiles, VOD commands, etc.).

A first tuner 412 is configured to tune to the first specified sub-frequency to recover the digital content. If the digital content is modulated, the recovered digital content is routed to a first demodulator 422. According to one embodiment of the invention, the first demodulator 422 performs quadrature amplitude demodulation (QAM) and routes the demodulated digital content to a conditional access (CA) module 440 deployed within the CableCARD 124.

A second tuner 414, however, is configured to tune to a second specified sub-frequency to recover certain OOB signaling over DOCSIS interconnect 113. If the received OOB signaling is modulated, it is routed to a second demodulator 424 that demodulates the OOB signaling. According to one embodiment of the invention, the second demodulator 424 performs QAM demodulation as well to recover MAC address for the digital device 120. The recovered MAC address is used by a DOCSIS MAC device 426 to verify that the OOB signaling was transferred to the proper location.

Once the MAC address has been authenticated, the DOCSIS MAC device 426 routes OOB signaling to the host processing block 430. The host processing block 430 routes EMM as well as copy protection keys to the OOB processing block 445 for processing as described above.

Referring now to FIG. 4, an exemplary embodiment of a digital device 120 implemented with a configurable Cable- CARD 124 is shown. Such communications are performed over an interface 500. The interface 500 comprises an extended channel interface 510, an out-of-band (OOB) interface 530 and a data interface 550. According to one embodiment, the pin configuration of the interface 500 is identical to a standard PCMCIA interface. However, during power-up of configurable CableCARD 124, a predetermined number of pins are reallocated to support OOB signaling over OOB interface 530.

As shown in this embodiment of the invention, the extended channel interface 510 enables information to be exchanged between a Host 505 (e.g., tuners 310/410, demodulators 320/420, host processing block 330/430, copy protection block 350/450 and A/V processing block 360/460) and the CableCARD 124. For instance, the Host 505 may transmit a message to indicate its receiver type (e.g., television receiver, set-top box receiver, integrated receiver/decoder, etc.). Likewise, the CableCARD 124 may transmit a message to indicate its CableCARD type. After the exchange of information and upon determination that the Host 505 is in communication with the CableCARD 124, certain bits of the interface 500 are reconfigured to support out-of-band signaling and operate as OOB interface 530.

Herein, the OOB interface 530 may be implemented as a unidirectional communication path from the Host 505 to the CableCARD 124. The program data transmitted over the OOB interface (e.g., system information, EMM, etc.) may be modulated in accordance with any of a variety of modulation schemes. For instance, the program data may undergo QPSK modulation. Of course, it is contemplated that other modulation schemes may be performed. Also, it is further contemplated that the OOB interface 530 may support bi-directional communications (e.g., 2-way QPSK signaling) instead of unidirectional communications as shown.

As further shown in this embodiment of the invention, the extended channel interface 510 enables one or more copy protection keys to be established. In general, a copy protection key is derived by an exchange of information between the Host 505 and the CableCARD 124. Either of these components may be initiate generation of the copy protection key.

The data interface 550 comprises one or more multi-bit communication paths, inclusive of a one or more scrambled streams 552 of digital content received by CableCARD 124 for descrambling. Also, one or more copy protected bit streams 554 may be transmitted from the CableCARD 124 to the Host 505. At least one copy protected bit stream features descrambled content from stream 552 that is encrypted with the previously negotiated copy protection key.

Referring still to FIG. 4, the CableCARD 124 comprises a non-volatile memory 560, an cryptographic block 565, an interface block 570, a volatile memory 575 and a coin cell 580. The cryptographic block 565 may be configured to support multiple conditional access (CA) operations as described below.

Herein, the non-volatile memory 560 is configured as secure memory (e.g., encrypted flash memory) to store information accessible by the cryptographic block 565. Examples of such information stored within secure, non-volatile memory 560 includes keys, entitlements, and code.

The coin cell 580 is a battery that is supplies power to battery-backed memory deployed within the CableCARD 124. For instance, a portion of volatile memory 575 may be battery-backed so as to operate as non-volatile memory.

The interface block 570 manages operations performed across the extended channel interface 510 and OOB interface 530. Moreover, the interface block 570 may be configured to filter certain multicast Internet Protocol (IP) addresses, perhaps a few multicast IP addresses, for enhancement management messages (EMMs).

Figure 5:
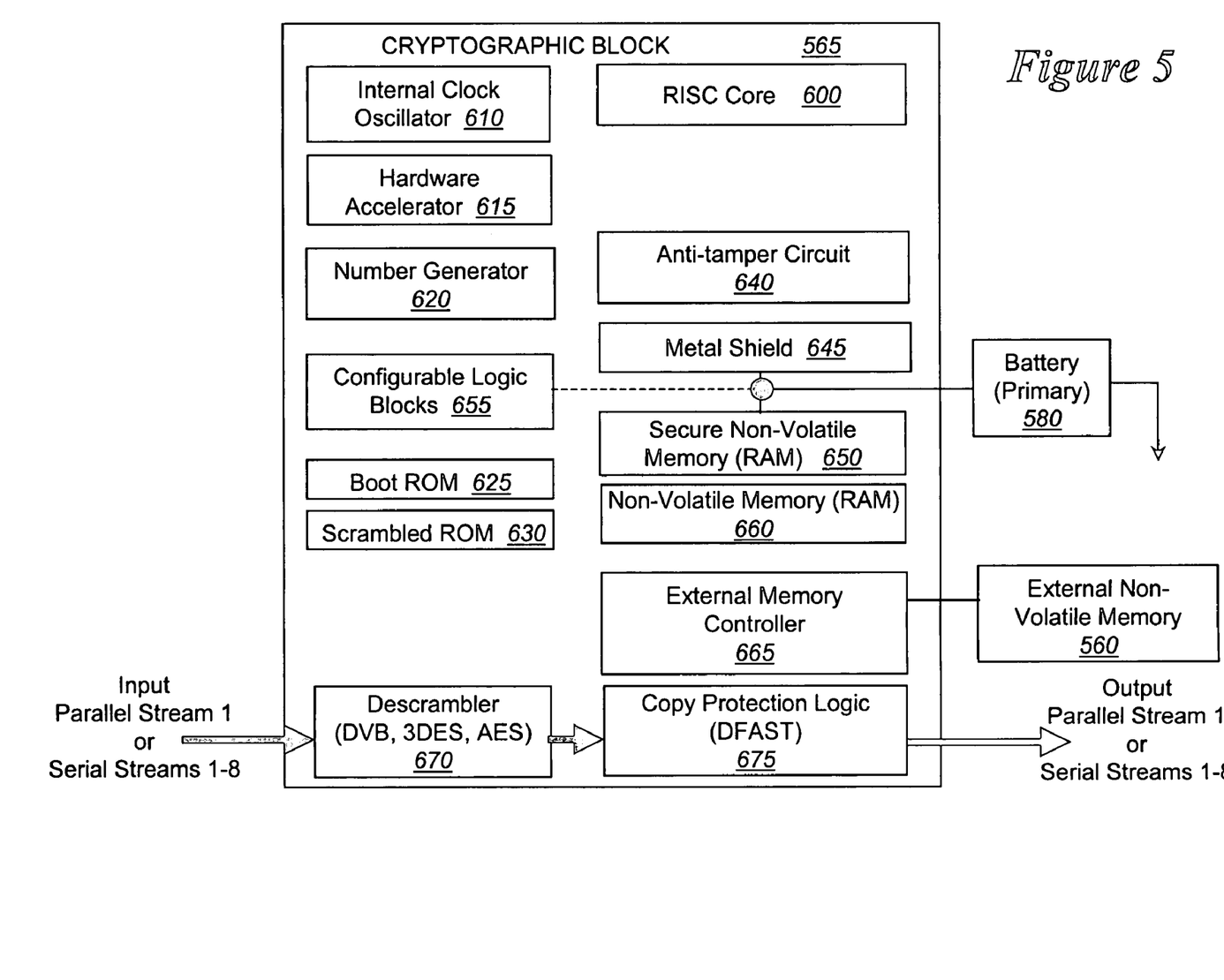
FIG. 5 is an exemplary embodiment of a cryptographic block of the configurable CableCARD of FIG. 1.

Referring to FIG. 5, an exemplary embodiment of the cryptographic block 565 of the CableCARD 124 is shown. According to one embodiment, cryptographic block 565 is configurable as a field-programmable gate array (FPGA). Of course, cryptographic block 565 may be configured as an applied specific integrated circuit (ASIC) or another configuration.

The cryptographic block 565 comprises two or more of the following: a core 600, an internal clock oscillator 610, a hardware accelerator 615, a number generator 620, a boot read-only memory (ROM) 625, a scrambled ROM 630, selected dual encryption logic 635, anti-tampering circuit 640, a metal shield 645, a secure non-volatile memory (e.g., battery-backed RAM) 650, at least one configurable logic block 655, a volatile memory 660, external memory controller 665, a descrambler 670 and copy protection logic 675.

The core 600 is hardware configured to process data within the cryptographic block 565. In communication with the configurable logic blocks, the core 600 may be a reduced instruction set computer (RISC) core. As an optional feature, the core 600 may comprise a cache memory of any selected size such as 32 kilobytes for example.

The internal clock oscillator 610 prevents an external clock from being hyper-clocked. In certain situations, by substantially increasing the clock frequency, an error condition may be exploited to recover sensitive information from the cryptographic block 565. By deploying an internal clock oscillator 610, the risks associated with hyper-clocking are reduced. The internal clock oscillator 610 is coupled to at least the core 600, hardware accelerator 615 and number generator 620.

Herein, the hardware accelerator 615 is adapted to increase the speed of computations conducted by cryptographic block 565 when performing cryptographic operations. According to one embodiment of the invention, the hardware accelerator 615 is adapted as an RSA accelerator.

The number generator 620 may be hardware and/or software used to produce data such as a random number or a pseudo-random number. This data is used to by the core 600 to produce session-based keys or other unique cryptographic data. Boot ROM 625 is firmware that is configured to initially provide the general functionality to the cryptographic block 565. The content of the boot ROM 625 may be in the clear or scrambled with a fixed key.

Scrambled ROM 630 is firmware that contains scrambled information that is descrambled and subsequently processed by core 600 and/or descrambler 670 during initialization of the cryptographic block 565. This scrambled information may include algorithms, routines and other data that is static in nature. The information is recovered by descrambling the scrambled information using a descramble key is supplied from the secure non-volatile memory 650. Therefore, if the cryptographic block 565 is tampered and power is lost to secure non-volatile memory 650, the contents of the scrambled ROM 630 is lost.

The descrambler 670 is adapted to receive one or more streams of digital content to descramble. The descrambling may be in accordance with DVB (64-bit), AES (128-bit), DES CBC or 3DES (168-bit).

The descrambled digital content is loaded into the copy protection logic 675, and thereafter, re-encrypted and outputted. The copy protection logic 675 features a copy protection algorithm, such as a Data Encryption Standard Electronic Code Book (DES ECB) for example, and a copy protection key. The copy protection key is derived through communications between the cryptographic block 565 and the Host 505 of FIG. 4, namely the host processing block in particular. As of this writing, the copy protection scheme used by the cable and consumer electronics industries is called "DFAST".

The external memory controller 665 is adapted to access data stored within the non-volatile memory 560 (e.g., encrypted flash) of FIG. 4 and decode the data before storage within the cryptographic block 565. For instance, the data may be stored within internal cache memory of the core 600 or within the volatile memory 660.

Anti-tampering circuit 640 is circuitry that deters tampering. For instance, as shown, the shield 645 may be made of a conductive material over which power is supplied to the secure non-volatile memory 650. Therefore, if the metal shield 645 is removed or damaged, the secure non non-volatile memory 650 may be powered off and all data stored therein would be lost. Other circuits include a light sensor that if powered in a lighted environment, the secure non-volatile memory 650 would be shorted to ground.

The configurable logic blocks 655 are provided by two or more CA providers. According to one embodiment of the invention, the configurable logic blocks 655 are not compilable gates; rather, the logic blocks 655 are optical spliced cells that are formed into a die forming the cryptographic block 565. During manufacture, logic blocks 655 are configured.

Figure 6:
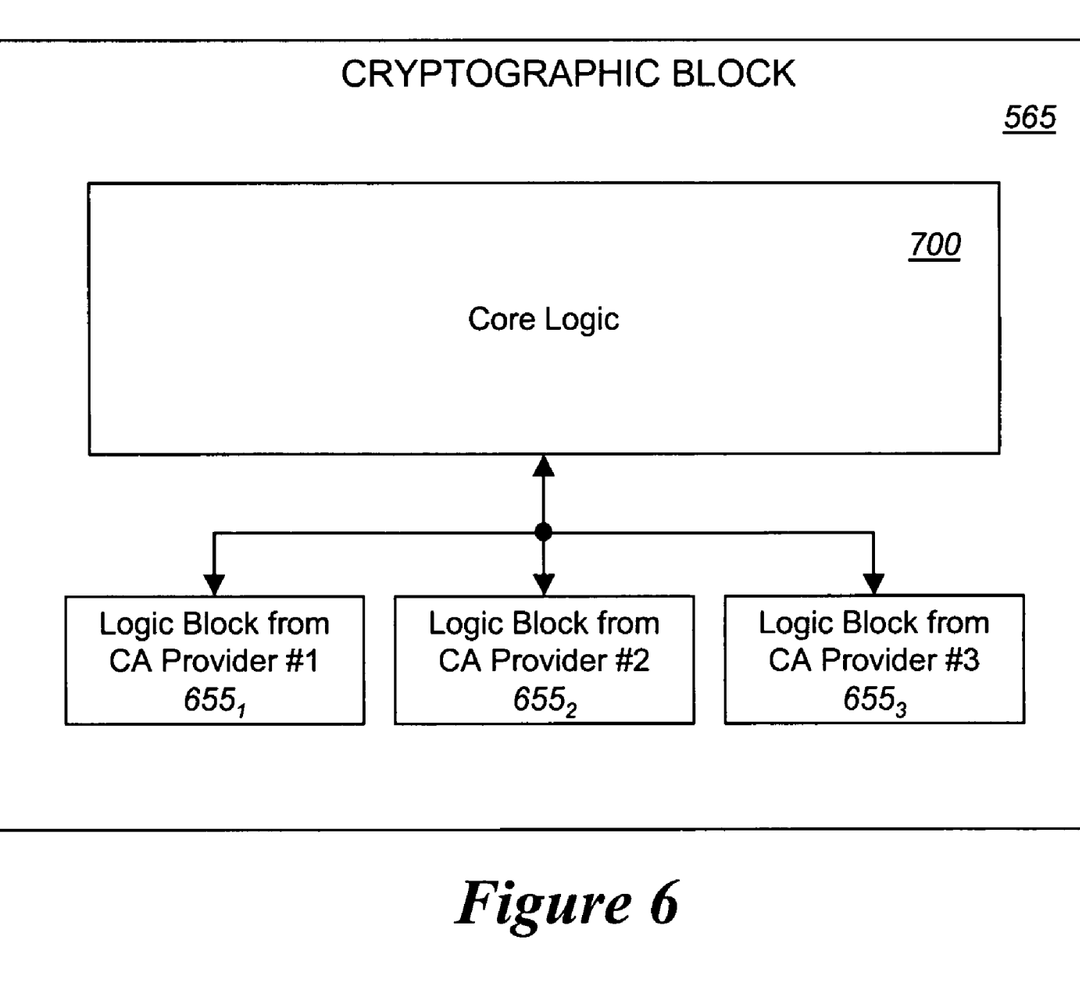
FIG. 6 is an exemplary embodiment of core logic and programmable logic devices of the cryptographic block of the configurable CableCARD of FIG. 5.

For instance, as shown in FIG. 6, logic blocks $655_1$ and $655_2$ are used and in communication with core logic 700 (e.g., processor core 600 and optionally one or more of the following components of FIG. 5: internal clock oscillator 610, hardware accelerator 615, number generator 620, boot ROM 625, scrambled ROM 630, selected dual encryption logic 635, anti-tampering circuit 640, metal shield 645, secure non-volatile memory 650, volatile memory 660, external memory controller 665, descrambler 670 shared by logic blocks $655_1$ and $655_2$, and copy protection logic 675). However, logic block $655_3$ will not be used by the cryptographic block 565. Therefore, logic block $655_3$ is disabled using lasers to cut traces as shown, although destruction of gate connections, power and ground connections or the like may be performed for disablement purposes. A CableCARD implemented in this way might allow a service provider to switch from one CA provider to another CA provider with logic blocks supported by that same CableCARD.

Of course, configurable logic blocks 655 may be implemented as a field programmable gate array (FPGA) or a programmable logic device (PLD) that is programmed once and battery-backed. Therefore, any disruption of power provided by power supply (e.g., coin cell 580 of FIG. 4), e.g. for probing and reverse engineering, would cause loss of data stored within the FPGA and/or PLD. The FPGA or PLD can be separately keyed and written from flash memory during the boot. A CableCARD implemented in this way might allow a service provider to stockpile "blank" CableCARDs and configure them on-the-fly for a given system with a particular CA requirement.

Figure 7:
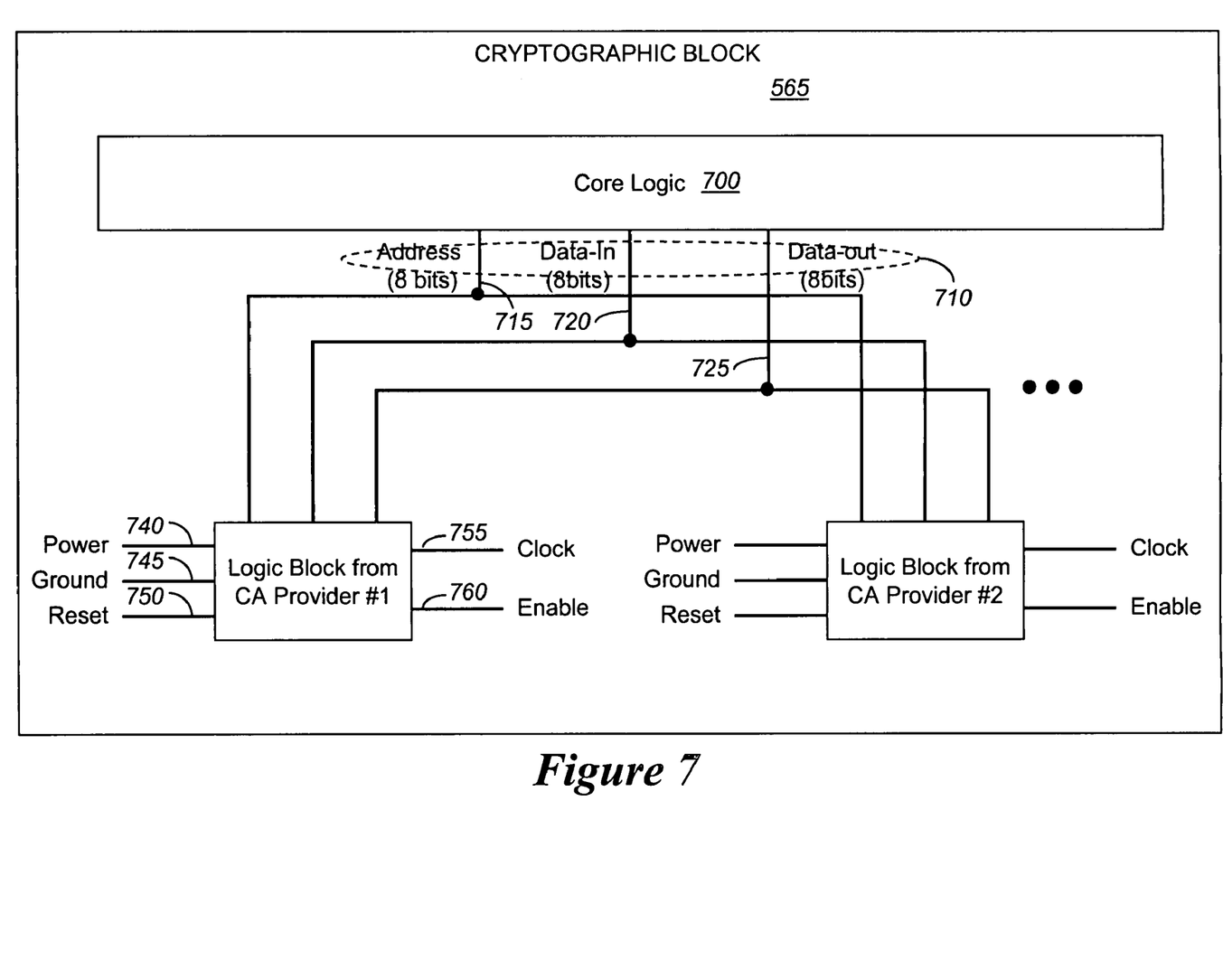
FIG. 7 is an exemplary embodiment of a cryptographic block of the CableCARD of FIG. 6.

Referring now to FIG. 7, an exemplary embodiment of the cryptographic block 565 of the CableCARD 124 is shown. The core logic 700 is in communication with a plurality of configurable logic blocks $655_1$-$655_N$ ($N \geq 1$) over a common interface 710. Each configurable logic block $655_1$-$655_N$ is produced by an optical mask and supports cryptographic operations (e.g., hashing, etc.), scrambling and descrambling, and other functionality.

According to one embodiment of the invention, each of the configurable logic blocks $655_1$-$655_N$ is adapted to the interface 710, which provides coupling to an address bus 715 and a data bus 720 utilized by the core logic 700. The data bus 720 may be separated into a data-in bus 725 and a data-out bus 730. The address bus 715 may be 8-bits in width while the data bus 720 is collectively 16-bits in width.

Each configurable logic block $655_1$-$655_N$ features a plurality of inputs. For instance, with respect to configurable logic block $655_1$, a first input 740 receives POWER from a power supply (e.g., coin cell 580 of FIG. 4). The power supply may be deployed on the CableCARD 124 or supplied to the CableCARD by a remote power supply. A second input 745 is GROUND. A third input 750 is RESET that, when activated, resets the cryptographic block 565. A fourth input 755 is an input to receive a clock (CLK) signal. For instance, the clock signal may be supplied from the internal clock oscillator 610 of FIG. 5. A fifth input 760 is an input for an ENABLE signal that, when set, allows the configuration block logic $655_1$ to function. Otherwise, the configuration block logic $655_1$ is deactivated. The ENABLE input 760 may be used in lieu of, or in addition to, the destruction of traces and connections during manufacturer.

Figure 8:
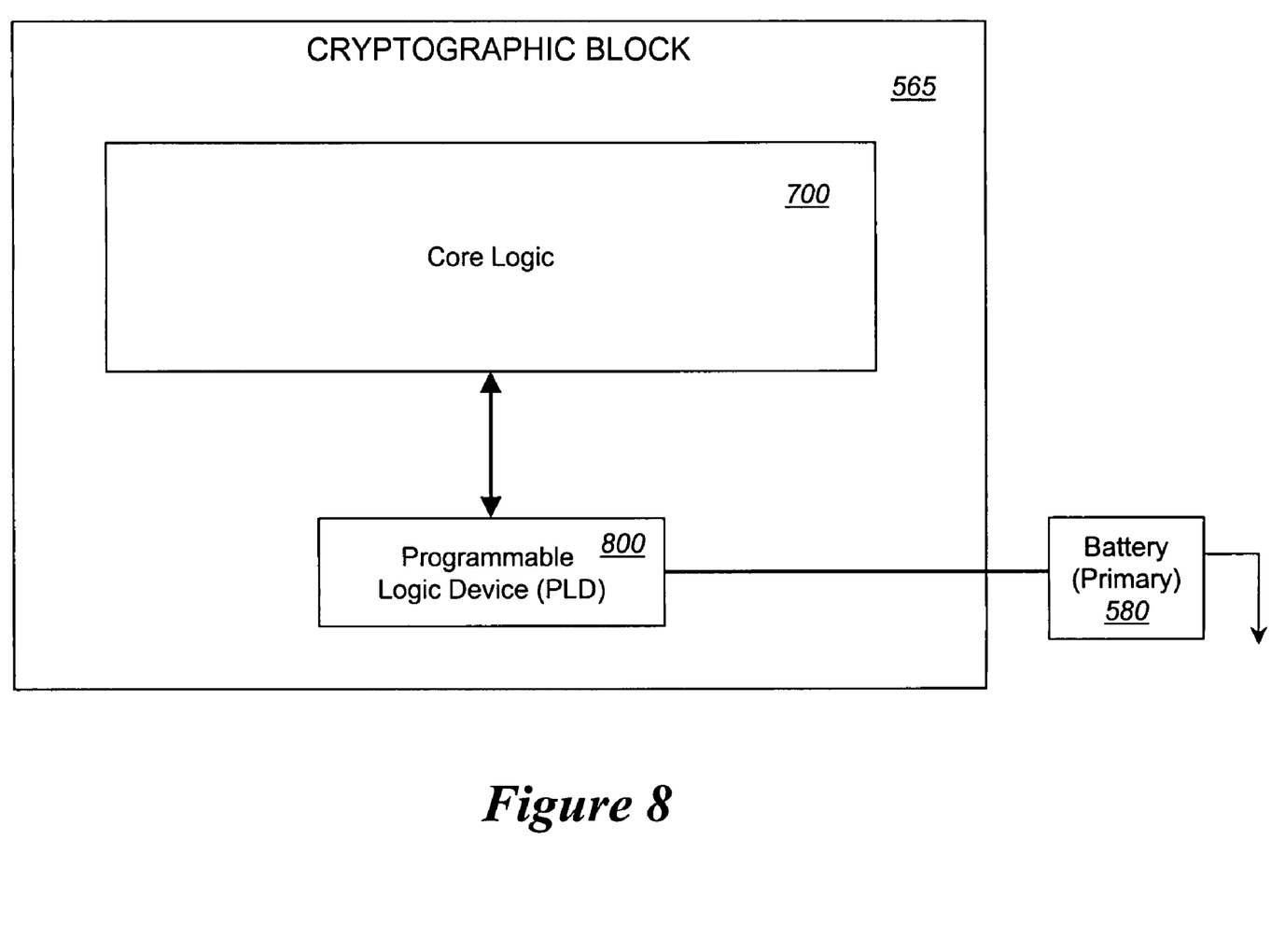
FIG. 8 is another exemplary embodiment of the cryptographic block of the CableCARD of FIG. 6.

Referring now to FIG. 8, another exemplary embodiment of the cryptographic block 565 of the CableCARD is shown. The core logic 700 is in communication with the programmable logic device (PLD) 800. The PLD 800 comprises programmable gates that are programmed once and battery backed. The battery may be the coin cell 580 of FIG. 4 or another power supply. Therefore, any disruption in power to PLD 800 will cause the cryptographic block 565 to be inoperative.

Figure 9:
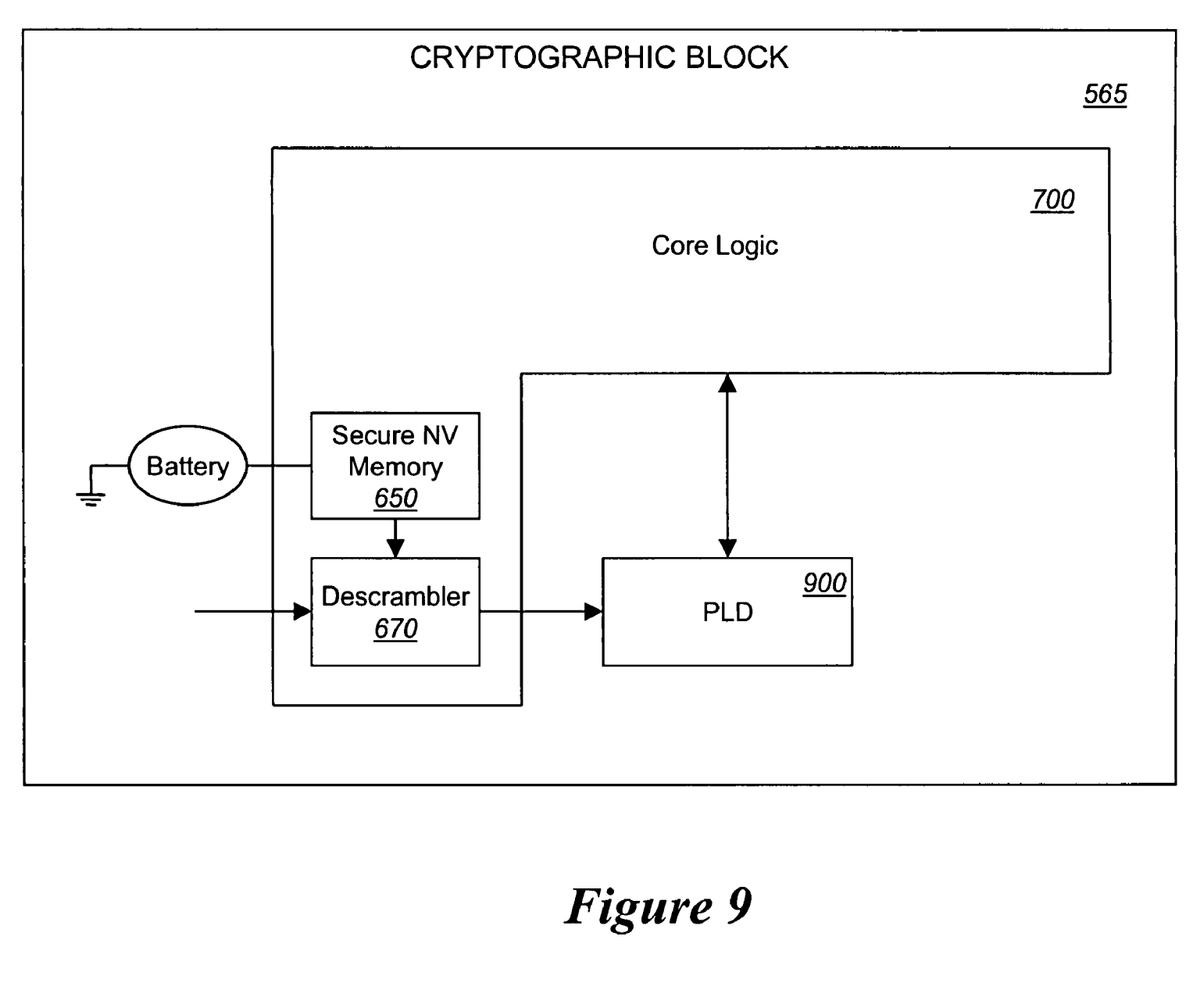
FIG. 9 is an exemplary embodiment of the cryptographic block of the CableCARD of FIG. 6.

Referring now to FIG. 9, another exemplary embodiment of the cryptographic block 565 of the CableCARD 124 is shown. The core logic 700 is in communication with the programmable logic device (PLD) 900. The PLD 900 comprises programmable gates that are programmed at every power-up. However, a special descrambling key 910 is loaded once and stored in non-volatile memory (e.g., secure non-volatile memory 650 of FIG. 5). Therefore, encrypted data is descrambled by the descrambler 670 using the descrambling key 910 in order to program the PLD 900. Any disruption in power to PLD 900 will effectively cause erasure of the descrambling key 910, and thus, the cryptographic block 565 will be inoperative.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than in a restrictive sense.

What is claimed is:

1. An apparatus adapted to a digital device, comprising:
   core logic;
   a first conditional access (CA) logic block connected to the core logic, the first CA logic block using a first CA function associated with a first CA provider; and
   a second CA logic block connected to the core logic, the second CA logic block using a second CA function associated with a second CA provider,
   wherein each of the first CA logic block and the second CA logic block further comprises a descrambler to descramble the incoming data; and wherein, when a connection between the core logic and the first CA logic block is disabled, descrambling of the incoming scrambled content is to be conducted according to the second CA function.

2. The apparatus of claim 1 is a CableCARD coupled to a set-top box.

3. The apparatus of claim 1, wherein the core logic comprising:
a processor core;
a secure non-volatile memory accessible by the processor core, the secure non-volatile memory to contain a key; and
a non-volatile memory accessible by the processor core, the non-volatile memory to contain information in a scrambled format, the information being recovered using the key contained in the secure non-volatile memory.

4. The apparatus of claim 3, wherein the core logic further comprises a descrambler shared by the first CA logic block and the second CA logic block to descramble the incoming data.

5. The apparatus of claim 3, wherein the core logic further comprises a metal shield surrounding the processor core, the secure non-volatile memory and the non-volatile memory, the shield being made of a conductive material over which power is supplied to the secure non-volatile memory.

6. The apparatus of claim 5, wherein the key is erased from the secure non-volatile memory if a supply of power is disrupted to the secure non-volatile memory due to tampering of the shield.

7. The apparatus of claim 1, wherein the first and second CA logic blocks are one-time programmable logic devices.

8. The apparatus of claim 1, wherein the first and second CA logic blocks are field programmable gate arrays.

9. The apparatus of claim 1, wherein the first CA function differs from the second CA function.

10. An apparatus adapted to a digital device, comprising:
core logic;
a plurality of conditional access logic blocks coupled to the core logic and including a first conditional access logic block and a second conditional access logic block, the first conditional access logic block using a first conditional access (CA) function associated with a first CA provider and the second conditional access logic block using a second CA function associated with a second CA provider,
wherein each of the plurality of conditional access logic blocks further comprises a descrambler to descramble the incoming data; and the first conditional access logic block of the plurality of conditional access logic blocks is enabled if the incoming scrambled content is scrambled according to the first CA function.

11. The apparatus of claim 10, wherein the core logic further comprises a descrambler shared by the plurality of conditional access logic blocks to descramble the incoming data.

12. The apparatus of claim 10, wherein each of the plurality of conditional access logic blocks is a field programmable gate array.

13. The apparatus of claim 10, wherein each of the plurality of conditional access logic blocks is a one-time programmable logic device.

14. The apparatus of claim 13, wherein each of the plurality of conditional access logic blocks is battery-backed so that disruption of power will cause all of the plurality of conditional access logic blocks to become inoperative.

15. The apparatus of claim 10, wherein each of the plurality of conditional access logic blocks is a programmable logic device including programmable gates that are programmed at every power-up.

16. The apparatus of claim 15, wherein the core logic comprises:
a battery-backed, non-volatile memory to contain a descrambling key; and
a descrambler coupled to the battery-backed non-volatile memory, the descrambler using the descrambling key to program the programmable gates of each of the plurality of conditional access logic blocks.

17. The apparatus of claim 10 being a network card connected to a set-top box.

18. An apparatus adapted for coupling to internal circuitry of a digital device and for descrambling incoming scrambled content, comprising:
core logic; and
a programmable logic device including a plurality of programmable gates programmed to operate in accordance with a conditional access (CA) function associated with a first CA provider to descramble the incoming scrambled content, the programmable gates of the programmable logic device are one-time programmable and battery-backed so that disruption of power will cause the programmable logic device to become inoperative; and wherein each of the plurality of conditional access logic blocks further comprises a descrambler to descramble the incoming data; and the first conditional access logic block of the plurality of conditional access logic blocks is enabled if the incoming scrambled content is scrambled according to the first CA function.

19. The apparatus of claim 18, wherein the core logic comprising:
a processor core;
a secure non-volatile memory accessible by the processor core, the secure non-volatile memory to contain a key;
a non-volatile memory accessible by the processor core, the non-volatile memory to contain information in a scrambled format, the information being recovered using the key contained in the secure non-volatile memory; and
a shield adapted to cover the processor core the secure non-volatile memory and the non-volatile memory, the shield being made of a conductive material over which power is supplied to the secure non-volatile memory.

20. The apparatus of claim 18, wherein the programmable gates of the programmable logic device are programmed at every power-up.

* * * * *